United States Patent
Hagiwara et al.

(10) Patent No.: US 8,516,805 B2
(45) Date of Patent: Aug. 27, 2013

(54) HYDRAULIC DRIVING DEVICE FOR WORK MACHINE

(75) Inventors: Naoki Hagiwara, Tsuchiura (JP); Tsuyoshi Nakamura, Tsuchiura (JP); Kensuke Sato, Tsuchiura (JP); Yasuo Okano, Tsuchiura (JP); Kouji Ishikawa, Tsuchiura (JP); Mitsuhiko Kanehama, Tsuchiura (JP); Hiroyuki Azuma, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 185 days.

(21) Appl. No.: 13/255,815

(22) PCT Filed: Mar. 9, 2010

(86) PCT No.: PCT/JP2010/053892
§ 371 (c)(1),
(2), (4) Date: Sep. 9, 2011

(87) PCT Pub. No.: WO2010/104075
PCT Pub. Date: Sep. 16, 2010

(65) Prior Publication Data
US 2012/0000191 A1     Jan. 5, 2012

(30) Foreign Application Priority Data
Mar. 11, 2009     (JP) ................ 2009-058474

(51) Int. Cl.
*F01N 3/00*     (2006.01)
(52) U.S. Cl.
USPC ................. 60/295; 37/348; 37/403
(58) Field of Classification Search
USPC ............. 414/685; 60/286, 295, 311, 284; 37/348; 701/50
See application file for complete search history.

(56) References Cited

U.S. PATENT DOCUMENTS

| | | | |
|---|---|---|---|
| 5,446,981 A * | 9/1995 | Kamada et al. ............... | 37/348 |
| 8,336,299 B2 * | 12/2012 | Kamiya et al. ............... | 60/295 |
| 2005/0155258 A1 * | 7/2005 | Nishimura et al. ............ | 37/403 |
| 2010/0122522 A1 * | 5/2010 | Tsukada et al. ............... | 60/284 |

FOREIGN PATENT DOCUMENTS

| | | | |
|---|---|---|---|
| JP | 7-166840 A | | 6/1995 |
| JP | 7166840 | * | 6/1995 |
| JP | 3073380 B2 | | 8/2000 |
| JP | 2001-55762 A | | 2/2001 |
| JP | 2003-155914 A | | 5/2003 |
| JP | 2003155914 | * | 5/2003 |
| JP | 2010-59620 A | | 3/2010 |

* cited by examiner

OTHER PUBLICATIONS

International Search Report dated Jun. 8, 2010 including English-language translation (Four (4) pages).

*Primary Examiner* — Thomas Denion
*Assistant Examiner* — Kelsey Gambrel
(74) *Attorney, Agent, or Firm* — Crowell & Moring LLP

(57) ABSTRACT

Disclosed is a hydraulic drive system for a working machine, which enables to conduct forced regeneration continuously for a sufficient time. Based on an input of a lock detection signal S1 from a gate lock detection switch 40, a controller 50 detects that a gate lock lever 32 for controlling a gate lock on/off valve 33 is in a locked state, in other words, hydraulic actuators such as an arm cylinder 12 arranged on a hydraulic excavator 1 are all in non-operated states. Upon an input of a forced regeneration command signal So from a forced regeneration switch 53 in this detected state, control signals Cp,Cf are outputted to a boosting control valve 51 and regulator 52 to make a forced regeneration means (an arm cylinder control valve 27 and the regulator 52) conduct forced regeneration.

5 Claims, 5 Drawing Sheets

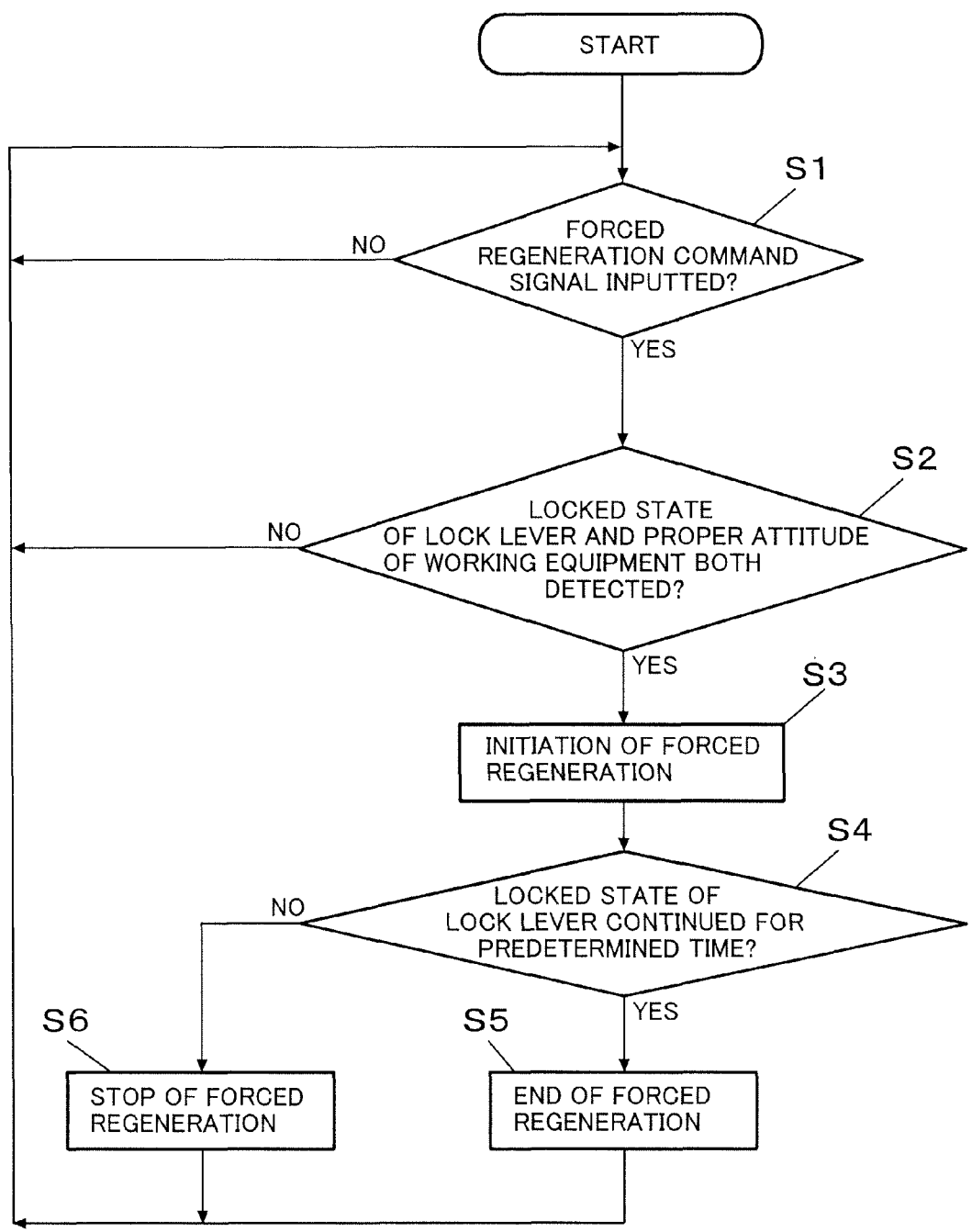

HYDRAULIC DRIVING DEVICE FOR WORK MACHINE

TECHNICAL FIELD

The present invention relates to a hydraulic drive system for a working machine such as a hydraulic cylinder. The hydraulic drive system can be adopted in the working machine, is provided with an exhaust gas purification device for capturing, by a filter, particulate matter in exhaust gas produced through incomplete combustion in an engine (prime mover), and burns particulate matter deposited on the filter to conduct its removal (so-called forced regeneration).

BACKGROUND ART

Conventionally, a hydraulic drive system for a working machine has been designed to permit detecting clogging of a filter in an exhaust gas purification device. When the working machine is in a non-operated state at the time of detection of clogging, the hydraulic drive system automatically performs both raising the delivery pressure of a hydraulic pump and increasing the delivery flow rate of the hydraulic pump in parallel, whereby an engine output is increased. This increase in engine output leads to a rise in the temperature of exhaust gas. When the temperature of the exhaust gas rises to a temperature needed for the burning of particulate matter, the particulate matter with which the filter is clogged burns off (see Patent Document 1).

PRIOR ART DOCUMENT

Patent Document
Patent Document 1: JP-B-3073380

DISCLOSURE OF THE INVENTION

Problem to Be Solved by the Invention

The above-mentioned, conventional hydraulic drive system automatically conducts forced regeneration in a non-operated state of the working machine, so that the continuation time of the forced regeneration depends on the length of the lasting time of the non-operated sate and the forced regeneration may not always be conducted continuously for a sufficient time. If forced regeneration of insufficient continuation time is repeated, particulate matter burns off in every forced regeneration in the filter at areas where the temperature is easy to rise, but at areas where the temperature is hard to rise, particulate matter does not sufficiently burn and remains and the deposit of particulate matter continues to proceed. Localized clogging of the filter as a result of such localized deposit of particulate matter as described above is more difficult to detect than overall clogging of the filter. Localized clogging of the filter, therefore, tends to be left uncleaned, thereby causing a reduction in engine output during operation of the working machine.

With the foregoing circumstances in view, the present invention has as an object thereof the provision of a hydraulic drive system for a working machine, which can conduct forced regeneration continuously for a sufficient time.

Means for Solving the Problem

To achieve the above-described object, the present invention is constituted as will be described next.

[1] The present invention is characterized in that in a hydraulic drive system for a working machine, said hydraulic drive system being provided with plural hydraulic actuators for driving the working machine, a hydraulic pressure source for producing, by a hydraulic pump, pressure oil to be fed to the plural hydraulic actuators, control valves separately arranged for the plural hydraulic actuators, respectively, to control flows of pressure oil between the corresponding hydraulic actuators and the hydraulic pressure source, an engine as a drive source for the hydraulic pump, an exhaust gas purification device for capturing, by a filter, particulate matter in exhaust gas produced by the engine, a forced regeneration means for burning particulate matter deposited on the filter, and a control means for controlling the forced regeneration means, said forced regeneration means serving to raise a delivery pressure of the hydraulic pump to increase an engine output such that the exhaust gas is provided with heat needed to burn the particulate matter, valve positions of the control valves are set to change between initial positions, in which the flows of pressure oil from the hydraulic pressure source to the hydraulic actuators are cut off to guide the pressure oil to a hydraulic oil reservoir, and operating positions, in which the pressure oil from the hydraulic pressure source is guided to the corresponding hydraulic actuators; the forced regeneration means includes a specific one of the control valves as a means for raising the delivery pressure of the hydraulic pump; the hydraulic drive system is further provided with a forced regeneration command means for commanding conduct of forced regeneration when operated, and also with a non-operated state detecting means for detecting a non-operated state in which the valve positions of all the control valves are in states of the initial positions; and taking as a condition for the conduct of forced regeneration that a non-operated state has been detected by the non-operated state detecting means, the control means actuates the specific control valve to raise the delivery pressure of the hydraulic pump when the conduct of forced regeneration is commanded by the forced regeneration command means.

In the present invention as described above in [1], the control means makes the forced regeneration means actuate the specific control valve to conduct forced regeneration when a non-operated state has been detected by the non-operated state detection means upon operation of the forced regeneration command means. In other words, an operator of the working machine can make the forced regeneration means initiate forced regeneration by operating the forced regeneration command means after the valve positions of all the control valves are brought into the states of initial positions, that is, into states that the working machine is inoperative. As a consequence, the operator can take time either before initiation of work or after completion of work by the working machine or periodically to purposefully conduct forced regeneration continuously for a sufficient time.

[2] The present invention may also be characterized in that in the invention as described above in [1], working equipment of the working machine is provided with a boom and an arm pivotally connected to the boom; the plural hydraulic actuators include an arm cylinder; the specific control valve is an arm cylinder control valve for controlling a flow of pressure oil between the arm cylinder and the hydraulic pressure source; the hydraulic drive system is further provided with a stroke-end state detection means for detecting that the arm cylinder has been brought into a state of a stroke end on a side where a free end of the arm is brought close to the boom; and the control means controls the arm cylinder control valve such that the arm cylinder operates toward the stroke end, and based on detection results by the stroke-end state detection means, also controls the arm cylinder control valve such that the stroke-end state of the arm cylinder is maintained during the forced regeneration.

In the present invention as described above in [2], the arm and boom take an attitude as a whole during the forced regeneration that they are folded back toward a body of the working machine. As a consequence, the space occupied by the working machine in horizontal direction during the forced regeneration can be maintained small. Further, as the motion of the arm upon forced regeneration, the arm is actuated such that the free end of the arm comes closer to the boom. Compared with an actuation that moves the free end of the arm away from the boom, the potential problem that the working equipment may come into contact with an object around the working equipment can be made hardly occur accordingly.

Taking a hydraulic excavator as an example, a description will be made about the stroke-end state of the arm cylinder. Hydraulic excavators may be divided into two types, one being backhoe shovels and the other loading shovels. In a backhoe shovel, a stroke end on an extended side of an arm cylinder corresponds to a state of the arm cylinder that the free end of an arm is brought closest to a boom. In a loading shovel, on the other hand, a stroke end on a contracted side of an arm cylinder corresponds to a state of the arm cylinder that the free end of an arm is brought closest to a boom.

[3] The present invention may also be characterized in that in the invention as described above in [1], working equipment of the working machine is provided with a boom, an arm pivotally connected to the boom, and a bucket or attachment pivotally connected to the arm; the plural hydraulic actuators include a bucket cylinder for pivoting the bucket or attachment connected to the arm; the specific control valve is a bucket cylinder control valve for controlling a flow of pressure oil between the bucket cylinder and the hydraulic pressure source; the hydraulic drive system is further provided with a stroke-end state detection means for detecting that the bucket cylinder has been brought into a state of a stroke end on an extended side or contracted side thereof; and the control means controls the bucket cylinder control valve such that the bucket cylinder operates toward the stroke end, and based on detection results by the stroke-end state detection means, also controls the bucket cylinder control valve such that the stroke-end state of the bucket cylinder is maintained during the forced regeneration.

In the present invention as described above in [3], a part of the working equipment, said part being to be actuated upon forced regeneration, is the bucket or attachment. Compared with the boom and arm, a change in the attitude of the working machine as a result of the actuation of such a part is limited smaller. Namely, in the present invention as described above in [3], the working equipment is actuated in association with forced regeneration but the forced regeneration can be conducted in a space smaller than that required for an actuation of the boom or arm out of the working equipment.

[4] The present invention may also be characterized in that in the invention as described above in [2], the stroke-end state detection means detects the state of the stroke end of the arm cylinder based on an attitude of the arm relative to the boom.

Working machines include those which are each provided, at a joint where a boom and an arm are pivotally connected with each other, with an angle sensor for detecting an attitude, in other words, angle of the arm relative to the boom. The present invention as described above in [4] can detect the stroke-end state of the arm cylinder by making use of the angle sensor.

[5] The present invention may also be characterized in that in the invention as described above in [3], the stroke-end state detection means detects the state of the stroke end of the bucket cylinder based on an attitude of the bucket or attachment relative to the arm.

Working machines include those which are each provided, at a joint where an arm and a bucket are pivotally connected with each other or at a link mechanism interposed between the arm and the bucket, with an angle sensor for detecting an attitude of the bucket relative to the arm, in other words, an angle of the bucket relative to the arm or an angle of the bucket relative to the link mechanism. The present invention as described above in [5] can detect the stroke-end state of the bucket cylinder by making use of the angle sensor.

Advantageous Effects of the Invention

According to the present invention, the operator can take time either before initiation of work or after completion of work by the working machine or periodically to purposefully conduct forced regeneration continuously for a sufficient time as mentioned above. The present invention can, therefore, contribute to the prevention of a reduction in engine output during operation of the working machine, which would otherwise be caused by leaving localized clogging of the filter uncleaned in the exhaust gas purification device.

BRIEF DESCRIPTION OF THE DRAWINGS

FIG. 2-1 is a hydraulic circuit diagram showing in a simplified form a hydraulic drive system arranged in the hydraulic excavator illustrated in FIG. 1.

FIG. 2-2 is a flow chart illustrating a flow of processing to be performed at a controller depicted in FIG. 2-1.

FIG. 3-1 is a hydraulic circuit diagram showing in a simplified form a hydraulic drive system according to a second embodiment of the present invention.

FIG. 3-2 is a flow chart illustrating a flow of processing to be performed at a controller depicted in FIG. 3-1.

MODES FOR CARRYING OUT THE INVENTION

A description will be made about the first and second embodiments of the present invention.

[First Embodiment]

Figure 1:
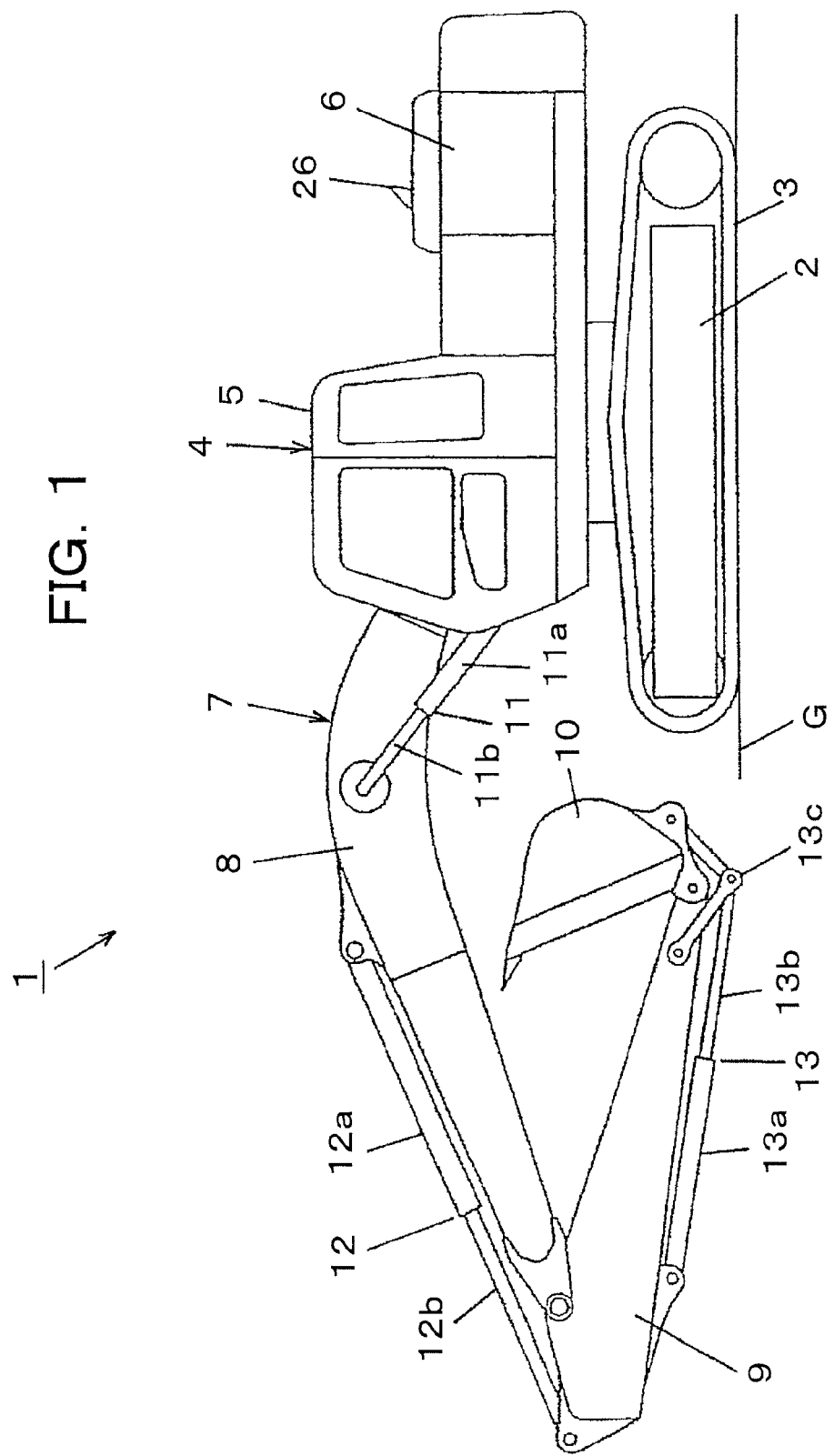
FIG. 1 is a left side view of a hydraulic excavator as a working machine according to a first embodiment of the present invention.
Figures 1, 2:
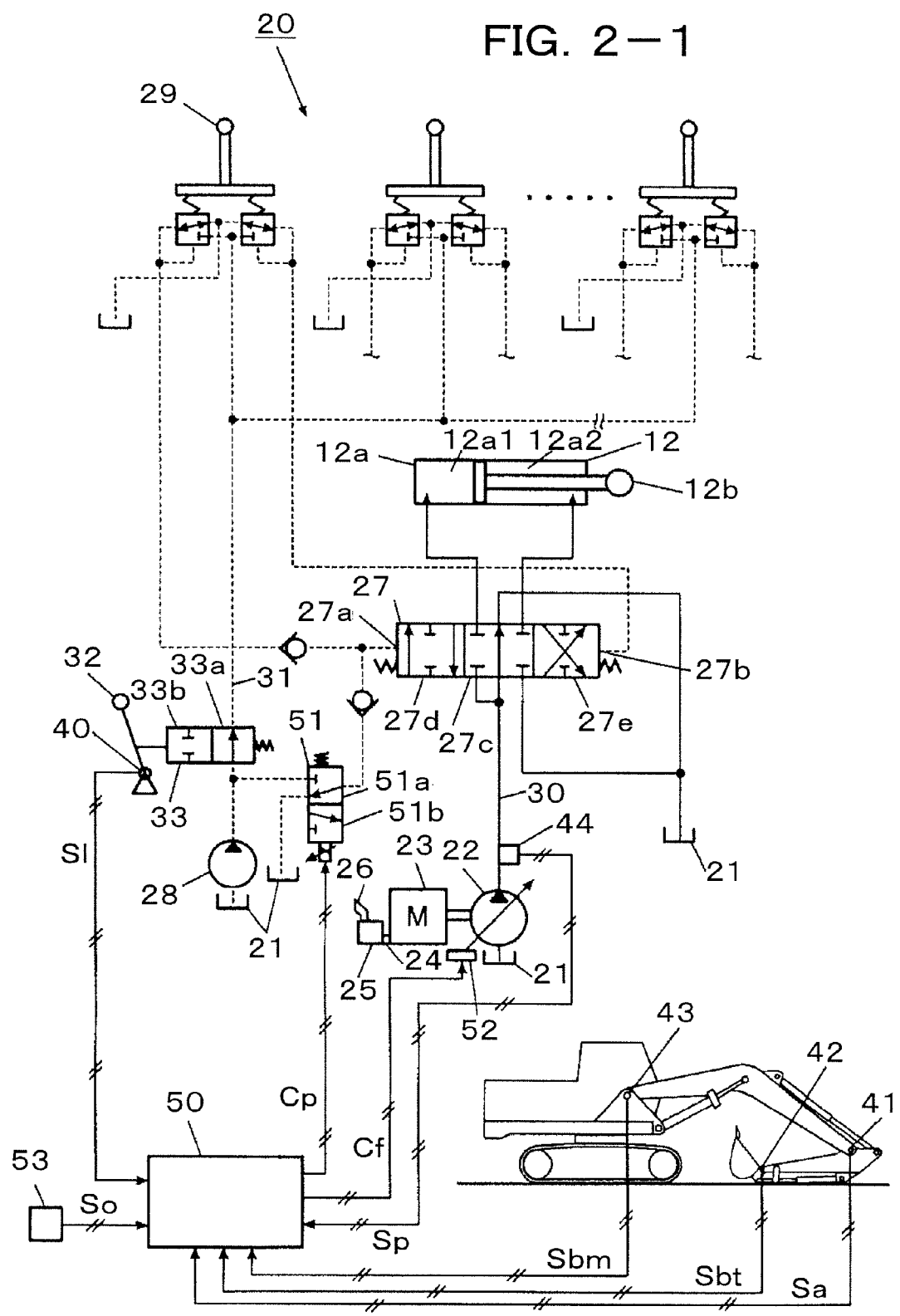

With reference to FIGS. 1, 2-1 and 2-2, a description will be made about the first embodiment. FIG. 1 is a left side view of a hydraulic excavator as a working machine according to the first embodiment of the present invention. FIG. 2-1 is a hydraulic circuit diagram showing in a simplified form a hydraulic drive system arranged in the hydraulic excavator illustrated in FIG. 1. FIG. 2-2 is a flow chart illustrating a flow of processing to be performed at a controller depicted in FIG. 2-1.

As illustrated in FIG. 1, the hydraulic excavator 1 is provided with a travel base 2 which runs by driving crawler tracks 3, a revolving upperstructure 4 swingably connected to the travel base 2, and working equipment 7 substantially centrally arranged on a front section of the revolving upperstructure 4.

On a left front section of the revolving upperstructure 4, an operator's cab 5 is mounted. Disposed behind the operator's cab 5 is an engine compartment 6, in which a main pump 22, engine 23 and the like of a hydraulic drive system 20 to be mentioned subsequently herein are accommodated. From a top part of the engine compartment 6, an outlet pipe 26 extends to guide exhaust gas from the engine 23 outward of the hydraulic excavator 1.

The working equipment 7 is provided with a boom 8. The boom 8 of the working equipment 7 is pivotally connected at one end thereof to the revolving upperstructure 4 via a pin. To the opposite end of the boom 8, an arm 9 is pivotally connected at one end thereof via a pin. To the opposite end of the arm 9, a bucket 10 is pivotally connected at one end thereof via a pin. The boom 8 is drivable by a boom cylinder 11. This boom cylinder 11 is pivotally connected at a bottom-side end of a cylinder tube 11a to the revolving upperstructure 4 via a pin, and is also pivotally connected at an end of a rod 11b to an intermediate part of the boom 8 via a pin. The arm 9 is drivable by an arm cylinder 12. This arm cylinder 12 is pivotally connected at a bottom-side end of a cylinder tube 12a to the boom 8 via a pin, and is also pivotally connected at an end of a rod 12b to the one end of the arm 9 via a pin. The bucket 10 is arranged such that an extending/retracting motion of a bucket cylinder 13 is transmitted via a link mechanism 13c to drive the bucket 10. This bucket cylinder 13 is pivotally connected at a bottom-side end of a cylinder tube 13a to the arm 9 via a pin, and is also pivotally connected at an end of a rod 13b to the link mechanism 13c via a pin.

As depicted in FIG. 2-1, the hydraulic drive system 20 according to the first embodiment is provided, as plural hydraulic actuators making up a drive source for the hydraulic excavator 1, with a left travel motor (not shown) and a right travel motor (not shown) as a drive source for the travel base 2, a swing motor (not shown) as a drive source for the revolving upperstructure 4, the boom cylinder 11, the arm cylinder 12, and the bucket cylinder 13. (It is to be noted that FIG. 2-1 depicts only the arm cylinder 12 and the remaining hydraulic actuators are omitted.)

A hydraulic pressure source for a drive pressure to be fed to these plural hydraulic actuators is the main pump 22 (variable-displacement hydraulic pump). A drive source for this main pump 22 is the engine 23 (prime mover: diesel engine). An exhaust gas pipe 24 extends from the engine 23, and this exhaust gas pipe 24 is provided with an exhaust gas purification device 25. The exhaust gas purification device 25 serves to capture, by a filter, particulate matter in exhaust gas produced by incomplete combustion of fuel in the engine 23. From the exhaust gas purification device 25, the above-described outlet pipe 26 extends.

Between the main pump 22 and the respective hydraulic actuators, actuator control valves are interposed to control the directions and flows of pressure oil to be fed to the hydraulic actuators. FIG. 2-1 depicts, as a representative of these actuator control valves, only an arm cylinder control valve 27 interposed between the main pump 22 and the arm cylinder 12. This arm cylinder control valve 27 is a hydraulically-piloted, spring-centered, 3-position valve. The valve position of the arm cylinder control valve 27 is set such that it changes between an initial position 27c (neutral position) and a first operating position 27d or also between the initial position 27c and a second operating position 27e. The initial position 27c (neutral position) is a valve position, in which a passage that guides pressure oil to a hydraulic oil reservoir 21 is formed while cutting off a flow of pressure oil from the main pump 22 to either a bottom chamber 12a1 or a rod chamber 12a2 of the arm cylinder 12. The first operating position 27d is a valve position on a side that the arm cylinder 12 is caused to extend, in which two passages are formed, one being a passage that guides pressure oil, which has been delivered from the main pump 22, to the bottom chamber 12a1 of the arm cylinder 12, and the other a passage that guides pressure oil, which is contained in the rod chamber 12a2, to the hydraulic oil reservoir 21. The second operating position 27e is a valve position on a side that the arm cylinder 12 is caused to contract, in which two passages are formed, one being a passage that guides pressure oil, which has been delivered from the main pump 22, to the rod chamber 12a2 of the arm cylinder 12, and the other a passage that guides pressure oil, which is contained in the bottom chamber 12a1, to the hydraulic oil reservoir 21. A boom cylinder control valve, bucket cylinder control valve, left travel motor control valve, right travel motor control valve and swing motor control valve are also constructed like the arm cylinder control valve 27.

A pilot pressure to be applied to the arm cylinder control valve 27 is produced by an arm control device 29. This arm control device 29 has a pair of lever-operated pilot valves, and using a delivery pressure of a pilot pump 28 as a primary pressure, a pilot pressure is produced by one of these pilot valves. Similar control devices as the arm control device 29 are arranged for the boom cylinder control valve, bucket cylinder control valve, left travel motor control valve, right travel motor control valve and swing motor control valve, respectively.

A pilot line 31 extending from the pilot pump 28, that is, a line that guides pressure oil, which is delivered from the pilot pump 28 and is distributed to all the control devices such as the arm control device 29, is provided with a gate lock on/off valve 33 which can collectively cut off the primary pressure to all the control devices.

The gate lock on/off valve 33 is a lever-operated, spring return valve, and is operated by a gate lock lever 32. In this gate lock on/off valve 33, the initial position corresponds to an open position 33a, and the operating position corresponds to a closed position 33b. The closed position 33b is a valve position, in which the pilot line 31 is closed and the primary pressure to all the control devices such as the arm control device 29 is collectively cut off. The gate lock lever 32 can be selectively held by an unillustrated construction in a locked position corresponding to the valve position of the gate lock on/off valve 33 or in a canceled position corresponding to the open position 33a of the gate lock on/off valve 33.

Attached to the gate lock lever 32 is a lock detection switch 40, which detects that the gate lock lever 32 is in a locked position, in other words, in a locked state, and outputs a lock detection signal S1 (electrical signal).

On the pin joint that pivotally connects the boom and the revolving upperstructure 4 with each other, a boom angle sensor 43 is arranged to output an angle of the boom 8 relative to the revolving upperstructure 4 by converting it into a boom angle detection signal Sbm (electrical signal). On the pin joint that pivotally connects the arm 9 and boom 8 with each other, an arm angle sensor 41 is arranged to output an angle of the arm 9 relative to the boom 8 by converting it into an arm angle detection signal Sa (electrical signal). On the pin joint that pivotally connects the arm 9 and bucket 10 with each other, a bucket angle sensor 42 is arranged to output an angle of the bucket 10 relative to the arm 9 by converting it into a bucket angle detection signal Sbt (electrical signal).

In a main line 30, a delivery pressure sensor 44 is arranged on a side upstream of all the actuator control valves such as the arm cylinder control valve 27 to output a delivery pressure of the main pump 22 by converting it into a delivery pressure detection signal Sp (electrical signal).

The arm cylinder control valve 27 has a pair of hydraulic pilot ports 27a,27b, and these hydraulic pilot ports 27a,27b are both connected to the arm control device 29. Further, only the hydraulic pilot port 27a is connected to a boosting control valve 51 in addition to the arm control device 29. When a pilot pressure is applied to the hydraulic pilot port 27a, a spool of the arm cylinder control valve 27 is moved to a side where the arm cylinder 12 brings the free end of the arm 9 closer to the boom 8, in other words, to the side of the first operating position which is the valve position on a side where the arm cylinder 12 is caused to extend. The boosting control valve 51 is interposed between an upstream side of the gate lock on/off valve 33 in the pilot line 31 and the hydraulic pilot port 27a. This boosting control valve 51 is a spring-return, proportional solenoid valve, and is actuated upon application of a control signal Cp (electrical signal). An initial position 51a is a valve position in which a passage is formed to bring the hydraulic pilot port 27a into communication with the hydraulic oil reservoir 21. An operating position 51b is a valve position in which a passage is formed to bring the hydraulic pilot port 27a into communication with the pilot pump 28. A pilot pressure to be applied to the hydraulic pilot port 27a changes steplessly depending on changes in the valve position of the boosting control valve 51, and becomes higher as the valve position comes closer to the operating position 51b.

The delivery flow rate of the main pump 22 is controlled by a regulator 52. This regulator 52 is electrically operated, and upon receipt of a control signal Cf (electrical signal), is actuated in a direction that the delivery flow rate of the main pump 22 is increased.

The engine 23 is controlled to obtain an engine output corresponding to every variation in the load on the main pump 22. The engine output, therefore, increases when the delivery flow rate of the main pump 22 increases and the delivery pressure of the main pump 22 rises. When the temperature of exhaust gas rises as a result of an increase in engine output and this temperature reaches a value needed for the burning of particulate matter, forced regeneration is conducted to burn off the particulate matter deposited on the filter of the exhaust gas purification device 25. The hydraulic drive system 20 is designed to permit conducting this forced regeneration. Upon forced regeneration, a means for increasing the delivery flow rate of the main pump 22 is the regulator 52, and as a means for raising the delivery pressure of the main pump 22, a specific one of all the actuator control valves, for example, the arm cylinder control valve 27 is used. Therefore, the arm cylinder control valve 27 and regulator 52 make up a forced regeneration means for increasing the engine output to provide the exhaust gas with heat needed to burn the particulate matter deposited on the filter of the exhaust gas purification device 25.

As a forced regeneration command means for commanding the conduct of forced regeneration when operated by a part of the body, a forced regeneration switch 53 is arranged. This forced regeneration switch 53 is a spring-return, push-button switch, and in its ON state, outputs a forced regeneration command signal So (electrical signal) as a command for conducting forced regeneration.

The lock detection signal S1 outputted from the lock detection switch 40, the boom angle detection signal Sbm outputted from the boom angle sensor 43, the arm angle detection signal Sa outputted from the arm angle sensor 41, the bucket angle detection signal Sbt outputted from the bucket angle sensor 42, the delivery pressure detection signal Sp outputted from the delivery pressure sensor 44 and the forced regeneration command signal So outputted from the forced regeneration switch 53 are inputted to the controller 50.

The controller 50 is a unit, which is provided with CPU, ROM, RAM and the like and is operated in accordance with a computer program. This controller 50 is set to determine whether or not the lock detection signal S1 has been applied from the lock detection switch 40. When the lock detection switch 40 is in a state of outputting a lock detection signal, the gate lock on/off valve 33 is in an operating state. As the pilot line 31 is cut off in this state, no pilot pressure is applied to any of the hydraulic pilot ports of all the actuator control valves such as the arm cylinder control valve 27 (the left travel motor control valve, right travel motor control valve, boom cylinder control valve, arm cylinder control valve 27, bucket cylinder control valve, and swing motor control valve), and therefore, all the actuator control valves assume the initial positions (neutral positions), respectively. By determining whether or not the lock detection signal S1 has been applied from the lock detection switch 40, the controller 50 hence functions as a non-operated state detection means for detecting a non-operated state in which all the actuator control valves assume the initial positions, respectively.

The controller 50 are set to control the boosting control valve 51 and regulator 52 by outputting the control signals Cp,Cf. The controller 50 and boosting control valve 51 make up a control means for controlling the forced regeneration means which is made up from the regulator 52 and arm cylinder control valve 27.

The controller 50 is set to determine, based on the boom angle detection signal Sbm from the boom angle sensor 43, the arm angle detection signal Sa from the arm angle sensor 41 and the bucket angle detection signal Sbt from the bucket angle sensor 42, whether or not the working equipment 7 is in a proper attitude. The proper attitude is a state in which as illustrated in FIG. 1, the bucket 10 is folded and carried over the arm 9, the arm 9 is folded and carried under the boom 8, and the boom 8 has descended with the end of the arm 9 (the link mechanism 13c) being in contact with a reference ground level G.

The controller 50 is set to operate according to steps S1 to S6 illustrated in FIG. 2-2. The controller 50 is actuated in association with a stat-up of the engine 23. When the forced regeneration command signal So is inputted from the forced regeneration switch 53 after the start-up (YES in step 51), the controller 50 determines whether or not the input of the lock detection signal S1 from the lock detection switch 40 is continuing, namely, whether or not the gate lock lever 32 is in a locked state (step S2). In parallel with this determination, the controller 50 also determines, based on the boom angle detection signal Sbm from the boom angle sensor 43, the arm angle detection signal Sa from the arm angle sensor 41 and the bucket angle detection signal Sbt from the bucket angle sensor 42, whether or not the working equipment 7 is in a proper attitude (step S2).

When the locked state of the gate lock lever 32 and the proper attitude are both detected by the determinations in step S2 (YES in step S2), the controller 50 makes the forced regeneration means (the arm cylinder control valve 27 and regulator 52) initiate forced regeneration (step S3). In other words, control signals Cp,Cf which correspond to preset control values are outputted to the boosting control valve 51 and regulator 52, respectively. No forced regeneration is initiated unless the locked state of the gate lock lever 32 and the proper attitude have been both detected (NO in step S2).

The boosting control valve 51 to which the control signal Cp has been applied produces a pilot pressure, and this pilot pressure is applied to the hydraulic pilot port 27a of the arm cylinder control valve 27. The valve position of the arm cylinder control valve 27, therefore, changes from the initial position 27c to the side of the first operating position 27d. As a result, the arm cylinder 12 extends, and in addition, the delivery pressure of the main pump 22 rises. On the other hand, the regulator 52 to which the control signal Cf has been applied increases the delivery flow rate of the main pump 22.

While the gate lock lever 32 is in the locked state, the engine 23 is controlled in an idling state for energy saving and noise reduction. In association with an increase in the delivery flow rate of the main pump 22 and a rise in its delivery pressure, however, the engine 23 is controlled to increase its output. When the engine output increases, the temperature of exhaust gas rises so that particulate matter burns with the heat of the exhaust gas, in other words, forced regeneration is conducted. During the forced regeneration, the controller 50 performs adjustments of the control signal Cp based on the delivery pressure detection signal Sp from the delivery pressure sensor 44 to maintain the delivery pressure of the main pump 22 at a predetermined pressure needed for the forced regeneration or higher.

From the time point of the initiation of the output of the control signal Cp to the boosting control valve 51, the controller 50 also determines, based on the arm angle detection signal Sa from the arm angle sensor 41, whether or not the arm cylinder 12 is in a stroke-end state on the extended side. Namely, the controller 50 functions as a stroke-end state detection means for detecting that the arm cylinder 12 is in the stroke-end state on the side where the free end of the arm 9 is brought closer to the boom 8, that is, on the extended side. Based on the results of the determination, the controller 50 applies the control signal Cp to the arm cylinder control valve 27 such that the stroke-end state of the arm cylinder 12 is maintained.

The controller 50 counts an elapsed time from the time point of the initiation of the output of the control signals Cp,Cf in step S3, and continues the output of the control signals Cp,Cf until elapse of a predetermined time as long as the detection of the locked state of the gate lock lever 32 continues. When the continuous output time of the control signals Cp,Cf has passed the predetermined time (YES in step S4), the output of these control signals Cp,Cf is stopped to end the forced regeneration (step S5). It is to be noted that the predetermined time is set as a time sufficient to remove particulate matter from the filter of the exhaust gas purification device 25.

When the locked state of the gate lock lever 32 has become no longer detected before the elapse of the predetermined time (NO in step S4), on the other hand, the controller 50 stops the output of the control signals Cp,Cf at this time point, and stops the forced regeneration (step S6).

According to the hydraulic drive system 20 of the first embodiment, the following advantageous effects can be brought about.

With the hydraulic drive system 20, the operator of the hydraulic excavator 1 can make the forced regeneration means (the arm cylinder control valve 27 and regulator 52) initiate forced regeneration by operating the forced regeneration switch 53 after bringing the valve positions of all the actuator control valves such as the arm cylinder control valve 27 into the states of initial positions, that is, into states, where the hydraulic excavator 1 is inoperative, by bringing the gate lock lever 32 into the locked state. As a consequence, the operator can take time either before initiation of work or after completion of work by the hydraulic excavator 1 or periodically to purposefully conduct forced regeneration continuously for a sufficient time. The hydraulic drive system 20 can, therefore, contribute to the prevention of a reduction in engine output during operation of the hydraulic excavator 1, which would otherwise be caused by leaving localized clogging of the filter uncleaned in the exhaust gas purification device 25.

In the hydraulic drive system 20, the arm 9 and boom 8 take an attitude as a whole during forced regeneration that they are folded back toward the revolving upperstructure 4 of the hydraulic excavator 1. As a consequence, the space occupied by the hydraulic excavator 1 in horizontal direction during the forced regeneration can be maintained small. Further, as the motion of the arm 9 upon forced regeneration, the arm 9 is actuated such that its free end comes closer to the boom 8. Compared with an actuation that moves the free end of the arm 9 away from the boom 8, the potential problem that the working equipment 7 may come into contact with an object around the working equipment 7 can be made hardly occur accordingly.

In the hydraulic drive system 20, the stroke-end sate of the arm cylinder 12 is detected based on the angle of the arm 9 relative to the boom 8, in other words, the attitude of the arm 9 relative to the boom 8. As the hydraulic excavator 1, there is one having an arm angle sensor 41 arranged irrelevant to forced regeneration. Using this arm angle sensor, the hydraulic drive system 20 can detect the stroke-end state of the arm cylinder.

It is to be noted that, although the above-described hydraulic drive system 20 according to the first embodiment is adopted in the backhoe shovel, the present invention is not limited to one adopted in such a backhoe shovel but may be adopted in a loading shovel. In a backhoe shovel, however, the stroke end on the extended side of an arm cylinder corresponds to the state of the arm cylinder that the free end of the arm is brought closest to the boom. In a loading shovel, on the other hand, the stroke end on the contracted side of the arm cylinder corresponds to the state of the arm cylinder that the free end of the arm is brought closest to the boom. It is, therefore, necessary to actuate the cylinder control valve to a side, where the arm cylinder is contracted, when the actuation of the arm upon force regeneration is set as an actuation that brings the free end of the arm closer to the boom.

In the hydraulic drive system 20, the arm cylinder control valve 27 is used as a specific actuator control valve. However, the specific control valve in the present invention may be the bucket cylinder control valve. According to this construction, a part of the working equipment, said part being to be actuated upon forced regeneration, is the bucket or an attachment. Compared with the boom and arm, a change in the attitude of the working machine as a result of the actuation of such a part is limited smaller. Namely, the forced regeneration can be conducted in a space smaller than that required for an actuation of the boom or arm out of the working equipment. As a hydraulic excavator, there is one provided with an angle sensor arranged irrelevant to forced regeneration at a pin joint, which pivotally connects the arm and bucket with each other, or at a link mechanism interposed between the arm and the bucket. When the bucket cylinder control valve is the specific control valve, the stroke-end state of the bucket cylinder can be detected by using the angle sensor.

The hydraulic drive system 20 has been described above by citing as an illustrative proper attitude the state that as illustrated in FIG. 1, the bucket 10 is folded and carried above the arm 9, the arm 9 is folded and carried under the boom 8, and the boom 8 has descended with the free end of the arm 9 (the link mechanism 13c) being in contact with the referenced ground level G. The proper attitude may, however, be other than the illustrated state. The proper attitude may be a state that only the arm is folded and carried under the boom, a state that only the bucket is folded and carried above the arm, or a state that only the arm and bucket are both folded under the boom. In other words, it is possible to adopt as a proper attitude insofar as at least one of the boom, arm and bucket is in such a state that it has been driven to a movable limit angle.

Second Embodiment

Figures 1, 3:
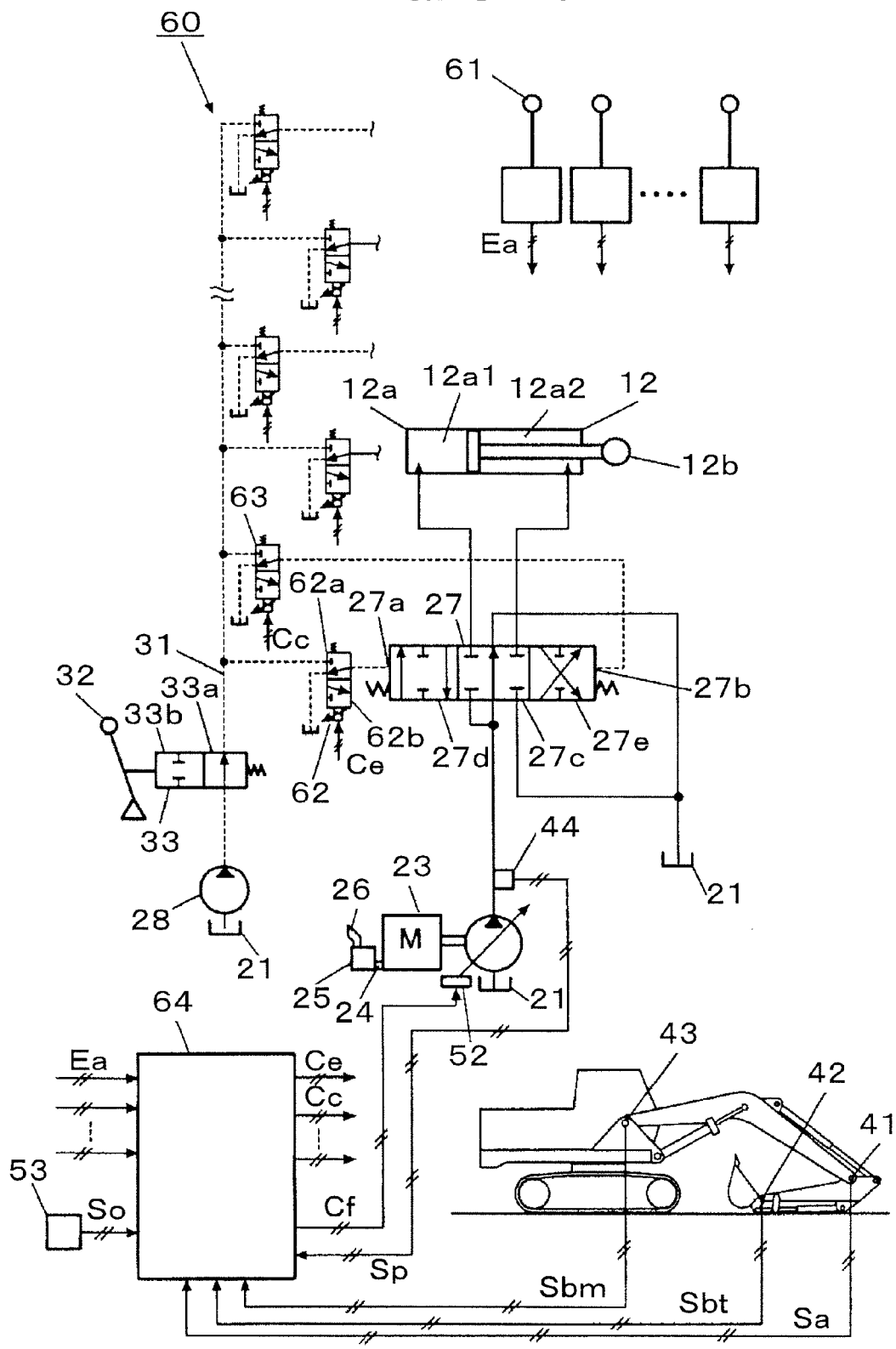
Figures 2, 3:
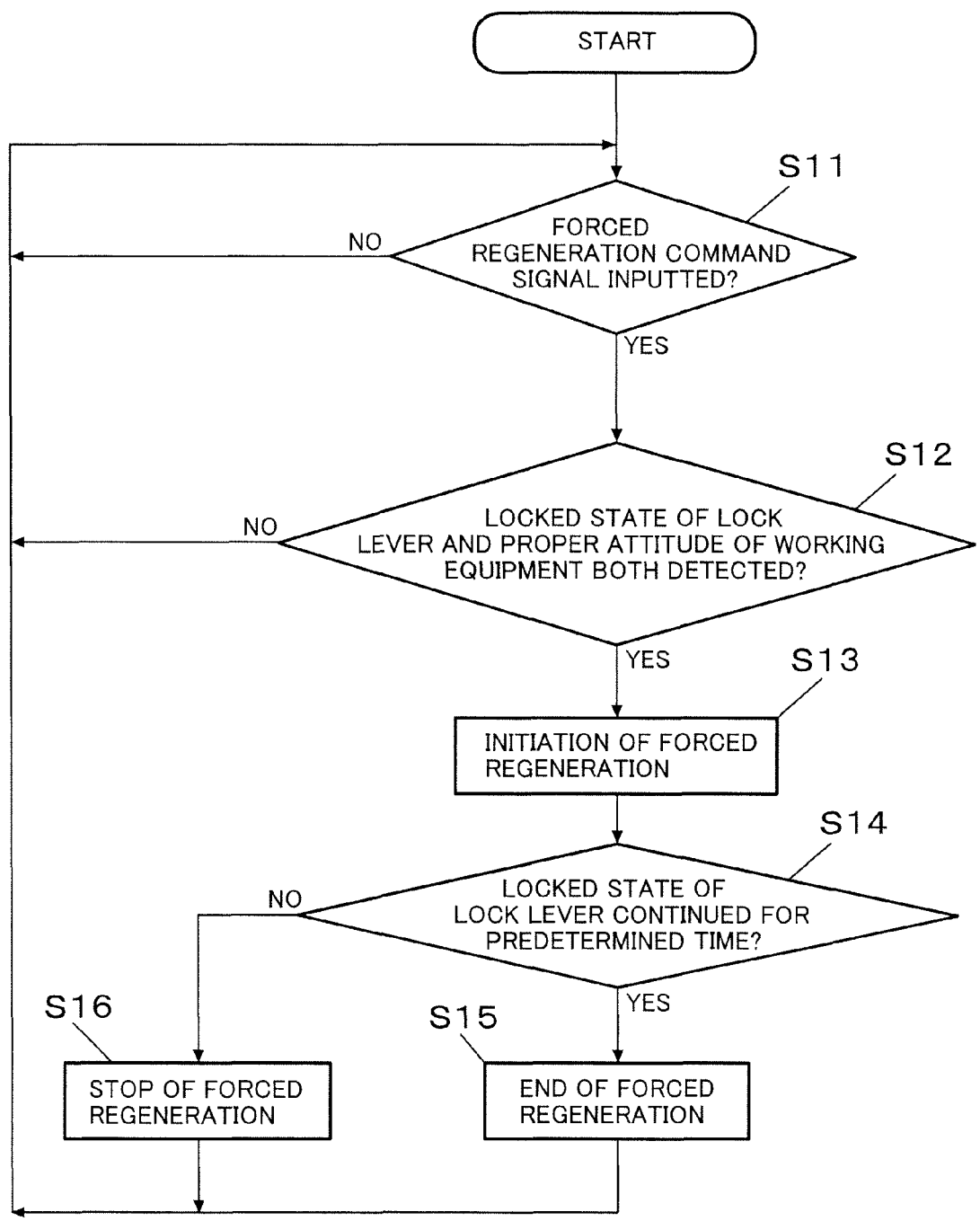

With reference to FIGS. 3-1 and 3-2, a description will be made about the second embodiment of the present invention. FIG. 3-1 is a hydraulic circuit diagram showing in a simplified form a hydraulic drive system according to the second embodiment of the present invention. FIG. 3-2 is a flow chart illustrating a flow of processing to be performed at a controller depicted in FIG. 3-1. Among elements and signals illustrated in FIG. 3-1, like elements and signals to the corresponding ones illustrated in FIG. 2-1 are designated using like reference signs.

In the hydraulic drive system 60 according to the second embodiment, the actuator control valves such as the arm cylinder control valve 27 are constructed such that they can be electrically controlled. Taking the arm cylinder control valve 27 as an example, a description will be made. The hydraulic pilot port 27a of the arm cylinder control valve 27 is provided with a proportional solenoid valve 62 as an accessory. The hydraulic pilot port 27b of the arm cylinder control valve 27 is provided with a proportional solenoid valve 63 as an accessory. The proportional solenoid valve 62 produces a pilot pressure, which is to be applied to the hydraulic pilot port 27a, by using the delivery pressure of the pilot pump 28 as a primary pressure. The proportional solenoid valve 63 produces a pilot pressure, which is to be applied to the hydraulic pilot port 27b, by using the delivery pressure of the pilot pump 28 as a primary pressure. A control signal Ce to be applied to a solenoid of the proportional solenoid valve 62 and a control signal Cc to be applied to a solenoid of the proportional solenoid valve 63 are both outputted from a controller 64.

The controller 64 is a unit, which has CPU, ROM, RAM and the like and is operated in accordance with a computer program. Inputted to the controller 64 are the boom angle detection signal Sbm outputted from the boom angle sensor 43, the arm angle detection signal Sa outputted from the arm angle sensor 41, the bucket angle detection signal Sbt outputted from the bucket angle sensor 42, the delivery pressure detection signal Sp outputted from the delivery pressure sensor 44, and the forced regeneration command signal So outputted from the forced regeneration switch 53.

To the controller 64, an actuation command signal Ea (electrical signal) which corresponds to a command value for the actuation of the arm cylinder 12 is inputted from an arm control device 29. The arm control device 29 has a lever-operated variable resistor, and outputs the control direction and control quantity of the control lever by converting them into the actuation command signal as an electrical signal. The controller 64 is set to compute control values for the proportional solenoid valves 62,63 based on the actuation command signal and to output control signals Ce,Cc corresponding to the control values. The proportional solenoid valves 62, 63 are spring-return control valves. In the proportional solenoid valve 62, an initial position 62a is a valve position in which a passage is formed to bring the hydraulic pilot port 27a into communication with the hydraulic oil reservoir 21, while an operating position 62b is a valve position in which a passage is formed to bring the hydraulic pilot port 27a into communication with the pilot pump 28. A pilot pressure to be applied to the hydraulic pilot port 27a changes steplessly depending on changes in the valve position of the proportional solenoid valve 62, and becomes higher as the valve position comes closer to the operating position 62b. The proportional solenoid valve 63 is also constructed like the proportional solenoid valve 62.

The actuator control valves other than the arm cylinder control valve 27, that is, the boom cylinder control valve, bucket cylinder control valve, left travel motor control valve, right travel motor control valve and swing motor control valve are also provided with proportional solenoid valves as accessories, which are similar to the proportional solenoid valves 62,63 for the arm cylinder control valve 27. Like the arm control device 29 for the arm cylinder control valve 27, the boom cylinder control valve, bucket cylinder control valve, left travel motor control valve, right travel motor control valve and swing motor control valve are also provided with control devices, respectively. By these control devices, actuation command signals (electrical signals) corresponding to command values for the actuation of the boom cylinder, arm cylinder, left travel motor, right travel motor and swing motor are inputted to the controller 64. Based on actuation command signals from the respective control devices other than the arm control device 29, the controller 64 computes, in a similar manner as for the actuation command signal Ea from the arm control device, control values for the proportional solenoid valves arranged as accessories for the actuator control valves corresponding to the actuation command signals, and outputs control signals corresponding to the control values.

The controller 64 is set to determine whether or not an actuation command signal has not been outputted from any of all the control devices such as the arm control device 61. In a state that no actuation command signal has been outputted from any of all the control devices, the controller 64 does not give a control signal to any of the proportional solenoid valves arranged as accessories for all the actuator control valves (the left travel motor control valve, right travel motor control valve, boom cylinder control valve, arm cylinder control valve 27, bucket cylinder control valve, swivel motor control valve). Accordingly, no pilot pressure is applied to any of the hydraulic pilot ports of all the actuator control valves such as the arm cylinder control valve 27, whereby all the actuator control valves assume the initial positions (neutral positions). Namely, the controller 64 functions as a non-operated state detection means for detecting a non-operated state, in which all the actuator control valves assume the initial positions, by determining whether or not the hydraulic drive system is in a state in which no actuation command signal has been outputted from any of all the control devices such as the arm control device 61.

Similar to the controller 50 in the first embodiment, the controller 64 is also set to determine, based on the boom angle detection signal Sbm from the boom angle sensor 43, the arm angle detection signal Sa from the arm angle sensor 41 and the bucket angle detection signal Sbt from the bucket angle sensor 42, whether or not the working equipment 7 is in a proper attitude.

In the second embodiment, the regulator 52 and arm cylinder control valve 27 make up a forced regeneration means as in the first embodiment. Different from the first embodiment, however, a control means for this forced regeneration means is made up from the controller 64 and proportional solenoid valve 62.

The controller 64 is set to operate according to steps S11 to S16 illustrated in FIG. 3-2. The controller 64 is actuated in association with a stat-up of the engine 23. When the forced regeneration command signal So is inputted from the forced regeneration switch 53 after the start-up (YES in step S11), the controller 64 determines whether or not no actuation command signal has been inputted from any of all the control devices such as the arm control device 61, namely, whether or not there is no actuation command (step S12). In parallel with this determination, the controller 64 also determines, based on the boom angle detection signal Sbm from the boom angle sensor 43, the arm angle detection signal Sa from the arm angle sensor 41 and the bucket angle detection signal Sbt from the bucket angle sensor 42, whether or not the working equipment 7 is in a proper attitude (step S12).

When the state of no actuation command from any control device and the proper attitude are both detected by the determinations in step S12 (YES in step S12), the controller 64 makes the forced regeneration means (the arm cylinder control valve 27 and regulator 52) initiate forced regeneration (step S13). In other words, control signals Ce,Cf which correspond to preset control values are outputted to the proportional solenoid valve 62 and regulator 52, respectively. No forced regeneration is initiated unless the state of no actuation command from any control device and the proper attitude have been both detected (NO in step S2).

The proportional solenoid valve 62 to which the control signal Ce has been applied produces a pilot pressure, and this pilot pressure is applied to the hydraulic pilot port 27a of the arm cylinder control valve 27. The valve position of the arm cylinder control valve 27, therefore, changes from the initial position 27c to the side of the first operating position 27d. As a result, the arm cylinder 12 extends, and in addition, the delivery pressure of the main pump 22 rises. On the other hand, the regulator 52 to which the control signal Cf has been applied increases the delivery flow rate of the main pump 22.

While all the actuators are in non-operated states, the engine 23 is controlled in an idling state for energy saving and noise reduction. In association with an increase in the delivery flow rate of the main pump 22 and a rise in its delivery pressure, however, the engine 23 is controlled to increase its output. When the engine output increases, the temperature of exhaust gas rises so that particulate matter burns with the heat of the exhaust gas, in other words, forced regeneration is conducted. During the forced regeneration, the controller 64 performs adjustments of the control signal Ce based on the delivery pressure detection signal Sp from the delivery pressure sensor 44 to maintain the delivery pressure of the main pump 22 at a predetermined pressure needed for the forced regeneration or higher.

From the time point of the initiation of the output of the control signal Ce to the proportional solenoid valve 62 in step S13, the controller 64 also determines, based on the arm angle detection signal Sa from the arm angle sensor 41, whether or not the arm cylinder 12 is in the stroke-end state on the extended side. Namely, the controller 64 functions as a stroke-end state detection means for detecting that the arm cylinder 12 is in the stroke-end state on the side where the free end of the arm 9 is brought closer to the boom 8, that is, on the extended side. Based on the results of the determination, the controller 64 applies the control signal Ce to the proportional solenoid valve 62 such that the stroke-end state of the arm cylinder 12 is maintained.

The controller 64 counts an elapsed time from the time point of the initiation of the output of the control signals Ce,Cf, and continues the output of the control signals Ce,Cf until elapse of a predetermined time as long as the detection of the state of no actuation command from any control device continues. When the continuous output time of the control signals Ce,Cf has passed the predetermined time (YES in step S14), the output of these control signals Ce,Cf is stopped to end the forced regeneration (step S15). It is to be noted that the predetermined time is set as a time sufficient to remove particulate matter from the filter of the exhaust gas purification device 25.

When the state of no actuation command from any control device has become no longer detected before the elapse of the predetermined time (NO in step S14), on the other hand, the controller 64 stops the output of the control signals Ce,Cf at this time point, and stops the forced regeneration (step S16).

According to the hydraulic drive system 60 of the second embodiment, the following advantageous effects can be brought about.

With the hydraulic drive system 60, the operator of the hydraulic excavator 1 can make the forced regeneration means (the arm cylinder control valve 27 and regulator 52) initiate forced regeneration by operating the forced regeneration switch 53 after bringing the valve positions of all the actuator control valves such as the arm cylinder control valve 27 into the states of initial positions, that is, into states, where the hydraulic excavator 1 is inoperative, by stopping operation of all the control devices such as the arm control device 29. As a consequence, the operator can take time either before initiation of work or after completion of work by the hydraulic excavator 1 or periodically to purposefully conduct forced regeneration continuously for a sufficient time. The hydraulic drive system 60 can, therefore, contribute to the prevention of a reduction in engine output during operation of the hydraulic excavator 1, which would otherwise be caused by leaving localized clogging of the filter uncleaned in the exhaust gas purification device 25.

In the hydraulic drive system 60, the arm 9 and boom 8 take, as in the hydraulic drive system 20 according to the first embodiment, an attitude as a whole during forced regeneration that they are folded back toward the revolving upperstructure 4 of the hydraulic excavator 1. As a consequence, the space occupied by the hydraulic excavator 1 in horizontal direction during the forced regeneration can be maintained small. Further, as the motion of the arm 9 upon forced regeneration, the arm 9 is actuated such that its free end comes closer to the boom 8. Compared with an actuation that moves the free end of the arm 9 away from the boom 8, the potential problem that the working equipment 7 may come into contact with an object around the working equipment 7 can be made hardly occur accordingly.

In the hydraulic drive system 60, the stroke-end sate of the arm cylinder 12 is also detected, as in the hydraulic drive system 20 according to the first embodiment, based on the angle of the arm 9 relative to the boom 8, in other words, the attitude of the arm 9 relative to the boom 8. As the hydraulic excavator 1, there is one having an arm angle sensor 41 arranged irrelevant to forced regeneration. Using this arm angle sensor, the hydraulic drive system 20 can detect the stroke-end state of the arm cylinder.

In the above-described hydraulic drive system 60 according to the second embodiment, the non-operated state detection means relies upon determining whether or not no actuation command signal has been outputted to the controller 64 from any of all the control devices. However, the non-operated state detection mean is not limited to such a means, but can be a similar non-operated state detection means as in the hydraulic drive system according to the first embodiment, specifically one capable of detecting a non-operated state by determining whether or not the gate lock lever 32 is in the locked state based on whether or not a lock detection signal has been outputted from the lock detection switch 40.

Similar to the above-described hydraulic drive system 20 according to the first embodiment, the hydraulic drive system 60 is also adopted in the backhoe shovel. However, the present invention is not limited to one adopted in such a backhoe shovel but may be adopted in a loading shovel.

In the hydraulic drive system 60, the arm cylinder control valve 27 is also used as a specific actuator control valve as in the hydraulic drive system 20 according to the first embodiment. However, the specific control valve in the present invention may be the bucket cylinder control valve.

Legend

1 Hydraulic excavator
2 Travel base
3 Crawler track
4 Revolving upperstructure
5 Operator's cab
6 Engine compartment
7 Working equipment
8 Boom
9 Arm
10 Bucket
11 Boom cylinder
11a Cylinder tube
11b Rod
12 Arm cylinder
12a Cylinder tube
12a1 Bottom chamber
12a2 Rod chamber
12b Rod
13 Bucket cylinder
13a Cylinder tube
13b Rod
13c Link mechanism
20 Hydraulic drive system
21 Hydraulic oil reservoir
22 Main pump
23 Engine
24 Exhaust gas pipe
25 Exhaust gas purification device
26 Outlet pipe
27 Arm cylinder control valve
27a, 27b Hydraulic pilot ports
27c Initial position
27d First operating position
27e Second operating position
28 Pilot pump
29 Arm control device
30 Main line
31 Pilot line
32 Gate lock lever
33 Gate lock on/off valve
40 Lock detection switch
41 Arm angle sensor
42 Bucket angle sensor
43 Boom angle sensor
44 Delivery pressure sensor
50 Controller
51 Boosting control valve
51a Initial position
51b Operating position
52 Regulator
53 Forced regeneration switch
60 Hydraulic drive system
62 Arm control device
62 Proportional solenoid valve (PSV)
62a Initial position
62b Operating position
63 Proportional solenoid valve (PSV)
64 Controller

The invention claimed is:

1. A hydraulic drive system for a working machine, said hydraulic drive system being provided with plural hydraulic actuators for driving the working machine, a hydraulic pressure source for producing, by a hydraulic pump, pressure oil to be fed to the plural hydraulic actuators, control valves separately arranged for the plural hydraulic actuators, respectively, to control flows of pressure oil between the corresponding hydraulic actuators and the hydraulic pressure source, an engine as a drive source for the hydraulic pump, an exhaust gas purification device for capturing, by a filter, particulate matter in exhaust gas produced by the engine, a forced regeneration means for burning particulate matter deposited on the filter, and a control means for controlling the forced regeneration means, said forced regeneration means serving to raise a delivery pressure of the hydraulic pump to increase an engine output such that the exhaust gas is provided with heat needed to burn the particulate matter, wherein:

valve positions of the control valves are set to change between initial positions, in which the flows of pressure oil from the hydraulic pressure source to the hydraulic actuators are cut off to guide the pressure oil to a hydraulic oil reservoir, and operating positions, in which the pressure oil from the hydraulic pressure source is guided to the corresponding hydraulic actuators;

the forced regeneration means includes a specific one of the control valves as a means for raising the delivery pressure of the hydraulic pump;

the hydraulic drive system is further provided with a forced regeneration command means for commanding conduct of forced regeneration when operated, and also with a non-operated state detecting means for detecting a non-operated state in which the valve positions of all the control valves are in states of the initial positions; and taking as a condition for the conduct of forced regeneration that a non-operated state has been detected by the non-operated state detecting means, the control means actuates the specific control valve to raise the delivery pressure of the hydraulic pump when the conduct of forced regeneration is commanded by the forced regeneration command means.

2. The hydraulic drive system according to the invention as described in claim 1, wherein:

working equipment of the working machine is provided with a boom and an arm pivotally connected to the boom;

the plural hydraulic actuators include an arm cylinder;

the specific control valve is an arm cylinder control valve for controlling a flow of pressure oil between the arm cylinder and the hydraulic pressure source;

the hydraulic drive system is further provided with a stroke-end state detection means for detecting that the arm cylinder has been brought into a state of a stroke end on a side where a free end of the arm is brought close to the boom; and the control means controls the arm cylinder control valve such that the arm cylinder operates toward the stroke end, and based on detection results by the stroke-end state detection means, also controls the arm cylinder control valve such that the stroke-end state of the arm cylinder is maintained during the forced regeneration.

3. The hydraulic drive system according to the invention as described in claim 1, wherein:
- working equipment of the working machine is provided with a boom, an arm pivotally connected to the boom, and a bucket or attachment pivotally connected to the arm;
- the plural hydraulic actuators include a bucket cylinder for pivoting the bucket or attachment connected to the arm;
- the specific control valve is a bucket cylinder control valve for controlling a flow of pressure oil between the bucket cylinder and the hydraulic pressure source;
- the hydraulic drive system is further provided with a stroke-end state detection means for detecting that the bucket cylinder has been brought into a state of a stroke end on an extended side or contracted side thereof; and
- the control means controls the bucket cylinder control valve such that the bucket cylinder operates toward the stroke end, and based on detection results by the stroke-end state detection means, also controls the bucket cylinder control valve such that the stroke-end state of the bucket cylinder is maintained during the forced regeneration.

4. The hydraulic drive system according to the invention as described in claim 2, wherein:
- the stroke-end state detection means detects the state of the stroke end of the arm cylinder based on an attitude of the arm relative to the boom.

5. The hydraulic drive system according to the invention as described in claim 3, wherein:
- the stroke-end state detection means detects the state of the stroke end of the bucket cylinder based on an attitude of the bucket or attachment relative to the arm.

* * * * *